April 8, 1947. A. A. ARNHYM 2,418,566
FUEL-AIR MIXTURE CONTROL FOR AIRCRAFT HEATERS
Filed May 11, 1942
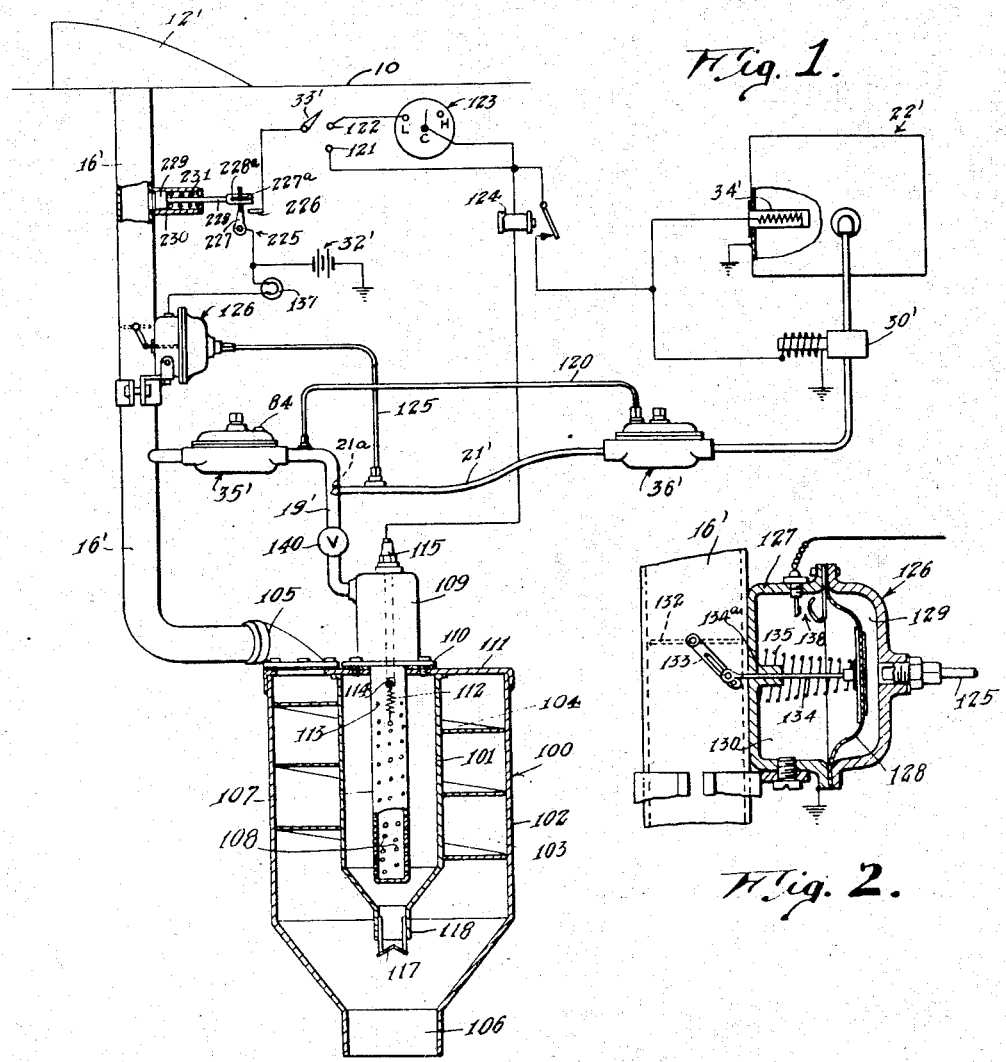
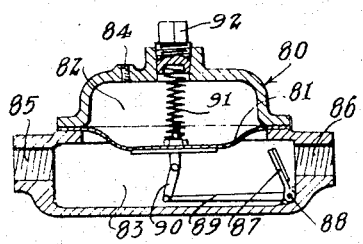
Inventor
Albert A. Arnhym
By Lyon & Lyon
Attorneys Patented Apr. 8, 1947

2,418,566

UNITED STATES PATENT OFFICE 2,418,566

FUEL-AIR MIXTURE CONTROL FOR AIRCRAFT HEATERS

Albert A. Arnhym, Point Loma, Calif., assignor, by mesne assignments, to Solar Aircraft Company, San Diego, Calif., a corporation of California Application May 11, 1942, Serial No. 442,442

2 Claims. (Cl. 158—28)

This invention relates to the heating of aircraft and particularly aircraft that operate through a wide range of altitudes and speeds, such as military airplanes.

A primary object of the invention is to provide a practicable heater that is effective at high altitudes.

Another object of the invention is to provide a heating apparatus that is self-complete and capable of easy and rapid installation in and removal from airplanes.

Another object is to provide a combustion heater that is self-regulating to compensate for different atmospheric pressures at different altitudes.

Another object is to provide a combustion heater of self-regulating type that is particularly simple and has no moving parts other than control valves.

Still another object is to provide a combustion heater that operates efficiently at high altitudes without the use of a supercharger.

Another object is to provide a combustion heater of very high overall efficiency that is relatively safe under all conditions of use and requires the minimum amount of attention and control.

Briefly, I accomplish the foregoing objects by so proportioning a gas-burning combustion heater as to provide the desired amount of heat when supplied with combustion air of the density existent at the maximum altitude and then automatically regulating the air and fuel supply to maintain the proper mixture at lower altitudes. This is in marked contrast to previous attempts to solve the problem by designing the heater for normal operation at ground level and then adding superchargers and the like to compensate for the reduced density of the air at high altitudes.

Other more specific objects and features of the invention will become apparent from the following detailed description of certain specific embodiments of the invention, as illustrated in the drawing, in which Fig. 1 is a schematic diagram of one embodiment of my invention.

Fig. 2 is a detail sectional view of a pressure-actuated control valve employed in the system of Fig. 1;

Fig. 3 is a detail sectional view showing a construction of regulator valve that can be employed in the system of Fig. 1.

One of the chief advantages of the system of Fig. 1 is that the products of combustion are mixed with the heated air and delivered to the passenger compartment or cockpit. An advantage of this construction is that the overall heating efficiency of the device is made substantially 100%, since all the heat generated is delivered to the passenger compartment. A further advantage is that the necessity for having efficient heat-transfer equipment is eliminated, thereby permitting much more compact and lighter apparatus.

The foregoing advantages of delivering all the products of combustion to the compartment to be heated are obvious, but such an arrangement has heretofore been considered not feasible because of the danger of contamination of the air in the passenger compartment. I have discovered, however, that this danger is negligible when employing propane as a fuel gas. The propane itself is non-poisonous and is not injurious to life, even when substantial concentrations of it are present in the air being breathed. Furthermore, the fire hazard is relatively slight because the limits of inflammable air-propane mixtures are very narrow and an inflammable mixture would not be likely to obtain in practice with my apparatus, even should the safety devices employed fail to prevent discharge of unignited propane into the passenger compartment.

In normal operation, I have found that the combustion in my apparatus is practically 100% complete, so that all of the carbon in the propane is converted into carbon dioxide and all of the hydrogen is converted into water. The carbon dioxide does not accumulate in sufficient concentrations to have any objectionable effect on the persons breathing it. This is particularly true because of the large volume of clean ventilating air that is supplied to and mixed with the combustion products in a proportion of approximately 10 to 1, so that the carbon dioxide in the combustion products forms only a small percentage of the total mixture emitted from the heater. The water vapor produced is actually beneficial, since the humidity is normally excessively low at high altitudes of flight.

Referring to Fig. 1, a stove 100 therein disclosed comprises a fire box 101, roughly cylindrical in shape, positioned within an outer casing 102, with an air space 103 between the two which may contain a helical baffle 104 for forcing the air flowing therethrough to follow a relatively long path and for conducting sufficient heat away from the fire box 101 to prevent it from getting too hot. Air enters the space 103 through a fitting 105 in the top wall of the stove from a conduit 16' which receives air from an air scoop 12' positioned exterior of the skin 10 of the aircraft. The heated air is discharged from the lower end of the stove 100 through an opening 106 in the outer wall 102.

The stove of Fig. 1 employs, within the fire box 101, a burner tube 107 having small discharge apertures 108 therein through which the mixture of air and propane is discharged in a multitude of small jets, the mixture burning within the fire box 101 as it issues from each jet.

The tube 107 is closed at the lower end and may be formed at the upper end integrally with a header 109 having a flange 110 which sets on and is secured to the top wall 111 of the stove, the wall 111 having a central aperture therein for the passage of the burner tube 107. An igniter coil 112 is positioned exterior of the burner tube 107 adjacent a pilot aperture 113. One end of the coil 112 is anchored and electrically connected directly to the burner tube 107. The other end extends through an insulated bushing 114 to the interior of the burner tube, thence through the header 109 and out through an insulated bushing 115 in the latter.

I find that smoother operation and more uniform heating of the fire box 101 is obtained if the apertures 108 in the burner tube 107 are positioned helically. It is also desirable to employ a baffle 117 just below the neck 118 of the fire box to divert the products of combustion laterally into the air stream issuing therepast and thereby reduce the chances of flame being projected through the opening 106 at the time of ignition of the gas. The baffle 117 is preferably conical in shape to give it rigidity and permit making it of relatively thin metal which will heat quickly and tend to complete the combustion of any incompletely burned gases.

It will be understood that the discharge opening 106 of the stove may be connected to a conduit system or may feed into a diffusing structure, if desired.

The system of Fig. 1 employs a pair of pressure regulating valves 35' and 36' respectively, corresponding in general function and structure to the valve illustrated in Fig. 3. This valve consists of a casing 80 having a flexible diaphragm 81 therein, which divides the interior of the casing into two separate chambers, 82 and 83, respectively. The chamber 82 is vented to the atmosphere by a vent 84 so that the upper side of the diaphragm 81 is always exposed to atmospheric pressure. The lower chamber 83 has a permanently opened discharge passage 85 and an inlet passage 86 that is adapted to be closed by a valve 87 under the control of the diaphragm 81. Thus the valve 87 is pivotally supported by a pivot 88 for swinging movement toward and away from the inner orifice of the passage 86 and has secured thereto an arm 89 connected by a link 90 to the diaphragm 81. A spring 91 is compressed between the upper side of the diaphragm and an adjusting plug 92 so that when the pressures in the chambers 82 and 83 are equal, the diaphragm is moved into the lower position (as shown in Fig. 3) by the spring 91, and the valve 87 is opened to permit flow through the inlet passage 86 into the chamber 83 and thence out through the outlet passage 85. Resistance to flow through the line connected to the outlet passage creates a pressure within the chamber 83, and when this pressure reaches a predetermined value sufficiently in excess of the atmospheric pressure in chamber 82 to compress the spring 91, the diaphragm is moved upward to close the valve 87. In operation, the valve is maintained in a partly opened position to admit gas at a rate just sufficient to maintain the desired pressure in the chamber 83 and the outlet passage 85. The value of this pressure is of course determined by the position of adjustment of the plug 92.

The valve 35' corresponds exactly in structure to the valve shown in Fig. 3, in that its vent 84 is open to the atmosphere. However, the vent of the regulator valve 36' is shown connected by a tube 120 to the pipe 19' closely adjacent the outlet of the regulator valve 35'. Hence the valve 36' tends to maintain the propane in the pipe 21' at a fixed differential pressure with respect to the air in the pipe 19' to better maintain the proper relative proportions of propane and air, despite any imperfections in the pressure regulation afforded by the regulator 35'.

As a matter of fact, it would be possible with the arrangement shown in Fig. 1 to completely eliminate the regulator 35' (connecting the pipe 19' directly to the pipe 16') and still maintain the proper mixture of air and propane for complete combustion. However, such a system would be less desirable than that disclosed, because the amount of heat produced would vary with variations in the pressure in the scoop 12' resulting from variations in speed and altitude of the aircraft.

In a particular apparatus tested, in which the pressure developed in the air scoop 12' varied between three and ten inches of water above atmospheric pressure, the regulator valve 35' was adjusted to deliver air at a pressure of two and one half inches of water, and the regulator valve 36' was adjusted to deliver propane at a pressure of approximately eight inches of water.

A higher pressure is employed on the propane than on the air because high pressure is available, and it permits the use of smaller conduits and the use of a jet 21a at the point of delivery of the propane into the combustion chamber. The jet effects a more thorough mixing of the propane with the air than if the propane were admitted to the combustion chamber through a large opening. Of course the jet must be chosen of suitable size for use with the particular pressure the regulator valve 36 is adjusted to deliver, in order to provide the proper relative proportion of air and propane for complete combustion.

The valves 35 and 36 function to deliver air and propane to the combustion chamber at substantially gauged pressures, irrespective of the altitude of flight and the atmospheric pressure. As used herein, "gauge pressure" means the pressure differential above the ambient atmospheric pressure such as would be indicated by an ordinary pressure gauge having an element exposed on one side to the pressure to be gauged and exposed on the other side to the ambient atmospheric pressure. As a result, the relative proportions of air and propane delivered to the heater are maintained substantially constant under different atmospheric pressures corresponding to different altitudes.

Although the propane can be delivered directly to the combustion chamber, it is desirable to deliver it to the pipe 19' which conveys combustion air into the heater. By introducing the propane into the air stream in front of the heater, a better mixture of the air and propane is obtained.

Several refinements are incorporated in the control system of Fig. 1. Thus the system includes a manually operated switch 33' having two contacts 121 and 122, a safety switch 225, a thermostat switch 123 and a relay 124. When the switch 33' is in open position, as shown in Fig. 1, the entire system is inactive. When the switch is closed on contact 122 a circuit is completed from the battery 32' through the safety switch 225 (assuming it to be closed), the thermostatic switch 123 and the relay 124 to the igniter coil 112. If the temperature is such as to demand heat, the thermostatic switch 123 will be closed, and current will flow through the relay 124 and the igniter coil 112 in series, pulling the relay and heating the igniter coil. Pulling of the relay completes a circuit over the contacts of the relay from the battery to a solenoid switch 30', opening the latter and permitting the flow of propane from the tank 22' to the regulator valve 36' and thence through the pipe 21' and through the jet in the end thereof into the pipe 19'. The regulator valve 36' may be adjusted to maintain a pressure in the pipe 21' of approximately eight inches of water above atmospheric pressure. This pressure is applied through a tube 125 to a pressure-actuated valve 126.

Thus referring to Fig. 2, the valve 126 comprises a casing 127 mounted on the pipe 16', and having a diaphragm 128 which divides the casing into two compartments 129 and 130, respectively. The compartment 129 is connected to the tube 125 which maintains the pressure in it the same as that in the pipe 21'. The compartment 130 is vented into the conduit 16'. A butterfly valve 132 in the pipe 16' has an arm 133 connected by a link 134 (extending through a guide opening 134a in the wall of the compartment 130) to the diaphragm 128, and the diaphragm is normally maintained in the position shown in Fig. 2 by a spring 135, opposing the pressure in the gas chamber 129, in which position the valve 132 is closed. However, when the solenoid valve 30' in the propane line has been opened and the pressure in pipe 21' rises to its normal value, this pressure, acting on the diaphragm 128, produces a force that compresses the spring 135 and moves the diaphragm to open the valve 132 and admit air to the heating system. If the air pressure below the valve 132 and in chamber 130 rises much above the pressure of the propane in chamber 129, it partly closes the valve 132, thereby tending to equalize the pressure of the air delivered to the system. However, the valve 126 does not close completely as long as any appreciable pressure exists in the pipe 21', since the spring 135 is preferably made very weak for the particular purpose of delaying closure of the valve 132 until substantially all gas pressure has been dissipated in the pipe 21' following shut-down of the system by closure of the solenoid valve 30'.

In a system of the type shown in Fig. 1, in which the products of combustion are delivered into the passenger compartment, it is undesirable to permit accumulations of unburned propane in the combustion chamber following shut-down of the system. Such accumulations are prevented by the control system described, in which the pressure-actuated valve 126 continues to admit air to maintain combustion in the stove following the closure of the solenoid valve 30' until substantially all pressure in the propane pipe 21' has been dissipated.

Another advantage of the control system of Fig. 1, employing the pressure-actuated valve 126, is that the valve 132 will remain closed when the propane tank 22' is exhausted, even though the switch 33' is left in "on" position, thereby preventing a flow of cold air through the duct 16' and the air space 103 of the stove, into the passenger compartment of the aircraft.

The solenoid valve 30' is actuated through the relay 124 connected in series with the igniter coil 112, to provide for the automatic closure of the valve 30' and the shut-down of the system should the igniter coil 112 burn out. The thermostatically controlled heater 34' in the propane tank 22' is also supplied with energizing current over the contacts of the relay 124 so that it is always deenergized when the system is shut-down.

If it is desired to maintain the heater in operation at all temperatures and without automatic regulation, the switch 33' is closed on the contact 121 to complete a circuit from the battery 32' around the thermostatic switch 123.

It is often desirable to provide a visual signal to indicate whether or not the heating system is in operation. Such a signal may be had by providing a pilot lamp 137 connected in series with the battery 32' and a switch 138 (Fig. 2) in the pressure-actuated valve 126. The switch 138 has a movable contact adapted to be closed on a fixed contact by the diaphragm 128 when the latter is moved into position to open the valve 132. The lamp 137 will therefore remain lighted as long as gas and air are supplied to the stove.

I have found that it is feasible to regulate the output of the stove to a certain extent by restricting the flow of the mixture of air and propane to the header 109. To this end a valve 140 may be inserted in the pipe 19' just in front of the header 109. This valve will never be completely closed, since it would not be employed to shut down the system. However, it may be partly closed to reduce the output, when desired.

As previously indicated, the circuit from the ungrounded terminal of the battery 32' to the manually controlled switch 33' is completed through a safety switch 225. This switch is responsive to air pressure in the conduit 16'. Thus the switch comprises a fixed contact 226 and a movable contact 227, the latter having a pin 227a engaging a slot 228a in a piston rod 228 connected to a piston 229 in a cylinder 230 connected at one end to the conduit 16'. The piston 229 is normally urged to the left by a compression spring 231 to shift the movable contact 227 clear of the contact 226 and open the circuit from the battery 32' to the switch 33', so that even if the latter switch is closed the system cannot operate. However, when the aircraft is in motion, to develop pressure in the conduit 16', the force exerted on the piston 229 is sufficient to overcome the force of the spring 231 and move the piston to the right, carrying the contact 227 onto the contact 226. The spring 231 is chosen of such stiffness, and the length of the contact 226 over which the contact 227 can move is of such length, that the switch is open whenever there is insufficient air pressure in the conduit 16' to operate the system.

The main purpose of the safety switch 225 is to exclude any possibility of products of incomplete combustion, or unburned propane, or cold air, from entering the cabin served by the heater. If it were not for this switch 225, closure of the switch 33' at a time when there was insufficient pressure in the conduit 16' would result in a stream of unburned propane passing through the heater and entering the cabin.

It is important, of course, that the intake scoop 12' be located in an area of positive pressure on the aircraft skin.

In the description heretofore, the fuel specifically mentioned has been propane, because this fuel has special advantages already pointed out. However, it is to be understood that the invention is in no sense limited to the use of propane, or even to the use of a fuel that is a gas at ordinary temperatures and pressures. Thus the fuel might be gasoline instead of propane, by providing suitable feeding means and properly choosing the size of the nozzle, and properly adjusting the delivery pressure of the regulator valve 36.

Of course when employing propane, the pressure required to deliver the propane from the fuel tank 22' is developed by evaporation of the propane itself. When gasoline is employed, it may be necessary to either so position the tank 22' as to provide gravity feed, or to provide a special fuel pump for delivering the gasoline under sufficient pressure.

Although for the purpose of explaining the invention certain specific systems incorporating the invention have been described in considerable detail, many departures from the exact designs disclosed can be made while still utilizing the invention, and the latter is, therefore, to be limited only to the extent set forth in the appended claims.

I claim:

1. A combustion heater for aircraft comprising: means forming a combustion chamber having a discharge opening, means for delivering atmospheric air at a first variable positive gauge pressure, a pressure reducing valve for supplying air from said first means to said combustion chamber at an approximately constant, positive gauge pressure that is below said first pressure, means for delivering fluid fuel to said combustion chamber, and means directly responsive to the pressure of the air supplied to said combustion chamber for supplying fluid fuel to said fuel-delivery means at a pressure fixed relative to the pressure of the air supplied by said pressure reducing valve.

2. A combustion heater for aircraft comprising: means forming a combustion chamber having a discharge opening vented to the atmosphere, means for supplying atmospheric air at a variable positive pressure, means including a pressure-reducing valve connecting said air supplying means to said combustion chamber for delivering air thereto at approximately constant gauge pressure, a source of fluid fuel under high pressure, and means including a pressure-reducing regulator valve and means for delivering fuel from said tank to said combustion chamber, said fuel regulator valve containing a control diaphragm exposed on one side to the pressure of fuel issuing from said regulator valve, and means for exposing the other side to the pressure of air delivered by said first-mentioned pressure-reducing valve.

ALBERT A. ARNHYM.

REFERENCES CITED

The following references are of record in the file of this patent:

UNITED STATES PATENTS

| Number | Name | Date |
|---|---|---|
| 2,285,672 | McCollum | June 9, 1942 |
| 2,281,107 | McCollum | Apr. 28, 1942 |
| 2,265,168 | Huffman et al. | Dec. 9, 1941 |
| 2,296,185 | Rose | Sept. 15, 1942 |
| 1,961,933 | Irwin | June 5, 1934 |
| 1,862,690 | Macrae et al. | June 14, 1932 |
| 2,259,299 | Dewey | Oct. 14, 1941 |
| 1,102,482 | De Vilbiss | July 7, 1914 |
| 286,341 | Spear | Oct. 9, 1883 |
| 2,269,705 | Besler | Jan. 13, 1942 |
| 1,914,949 | Hardgrove | June 20, 1933 |
| 1,562,663 | Strong | Nov. 24, 1925 |
| 2,314,089 | Hess et al. | Mar. 16, 1943 |
| 241,208 | Gill | May 10, 1881 |
| 1,936,362 | Kennedy | Nov. 21, 1933 |
| 2,264,347 | Udale | Dec. 2, 1941 |
| 1,655,214 | Boetz | Jan. 3, 1928 |
| 1,357,598 | Thompson | Nov. 2, 1920 |
| 1,834,130 | McKee | Dec. 1, 1931 |
| 1,958,913 | Coriolis et al. | May 15, 1934 |
| 2,231,445 | Grapp | Feb. 11, 1941 |
| 1,629,921 | Mansfield | May 24, 1927 |
| 2,330,298 | McCollum | Sept. 28, 1943 |
| 2,364,214 | Hess et al. | Dec. 5, 1944 |